United States Patent
Darde et al.

(10) Patent No.: US 9,435,582 B2
(45) Date of Patent: Sep. 6, 2016

(54) METHOD AND APPARATUS FOR LIQUEFYING A GAS OR COOLING A FEED GAS AT SUPERCRITICAL PRESSURE

(75) Inventors: Arthur Darde, Paris (FR); Xavier Traversac, Paris (FR)

(73) Assignee: L'Air Liquide Société Anonyme Pour L'Étude Et L'Exploitation Des Procedes Georges Claude, Paris (FR)

( * ) Notice: Subject to any disclaimer, the term of this patent is extended or adjusted under 35 U.S.C. 154(b) by 292 days.

(21) Appl. No.: 14/111,349

(22) PCT Filed: Apr. 12, 2012

(86) PCT No.: PCT/FR2012/050797
§ 371 (c)(1),
(2), (4) Date: Oct. 11, 2013

(87) PCT Pub. No.: WO2012/140369
PCT Pub. Date: Oct. 18, 2012

(65) Prior Publication Data
US 2014/0026611 A1 Jan. 30, 2014

(30) Foreign Application Priority Data
Apr. 14, 2011 (FR) ...................................... 11 53245

(51) Int. Cl.
*F25J 1/00* (2006.01)
*F25J 1/02* (2006.01)
*F25J 3/06* (2006.01)

(52) U.S. Cl.
CPC *F25J 1/00* (2013.01); *F25J 1/004* (2013.01); *F25J 1/0027* (2013.01); *F25J 1/0042* (2013.01);
(Continued)

(58) Field of Classification Search
CPC ...... F25J 1/0202; F25J 1/0262; F25J 1/0263; F25J 1/0264; F25J 3/067; F25J 2270/02; F25J 2270/80; F25J 1/0042; F25J 1/0045; F25J 1/0027; F25J 2230/30; F25J 2230/80
See application file for complete search history.

(56) References Cited

U.S. PATENT DOCUMENTS

| 3,315,477 | A | 4/1967 | Carr |
| 6,006,545 | A * | 12/1999 | Tranier ................. F25J 1/0015 62/615 |
| 6,658,890 | B1 | 12/2003 | Hahn et al. |
| 2008/0196585 | A1 | 8/2008 | Ha |
| 2009/0013868 | A1 | 1/2009 | Darde et al. |

FOREIGN PATENT DOCUMENTS

GB 2416389 A 1/2006

OTHER PUBLICATIONS

Aspelund, A., et al., Gas conditioning—The interface between CO2 capture and transport, Int J Greenh Gas Con, I, (2007) 343-354.
International Search Report and Written Opinion for FR1153245, Feb. 9, 2012.
(Continued)

*Primary Examiner* — Keith Raymond
(74) *Attorney, Agent, or Firm* — Justin K. Murray

(57) ABSTRACT

The invention relates to a method for liquefying a feed gas or cooling a feed gas at supercritical pressure, in which the feed gas mixed with a cycle gas is condensed or cooled in order to form a supercritical gas or liquid at the first pressure, the liquid at the first pressure is cooled in a first heat exchanger (E2), the cooled liquid is removed from the first exchanger and expanded up to a second pressure that is lower than the first pressure in order to form an expanded flow, at least one portion of the expanded flow is cooled in a second heat exchanger, the expanded flow is removed from the second heat exchanger (E2), said flow is split into at least two portions, including a first portion and a second portion, the first portion of the expanded flow constituting the liquefied product, the second portion and preferably a third portion being vaporized in the second heat exchanger and the thus-formed at least one cycle gas is then mixed with the feed gas and compressed in a compressor, before or after being mixed with the feed gas.

8 Claims, 4 Drawing Sheets

(52) U.S. Cl.
CPC ............ *F25J 1/0045* (2013.01); *F25J 1/0202* (2013.01); *F25J 1/0262* (2013.01); *F25J 1/0263* (2013.01); *F25J 1/0264* (2013.01); *F25J 3/067* (2013.01); *F25J 2210/70* (2013.01); *F25J 2220/82* (2013.01); *F25J 2230/30* (2013.01); *F25J 2230/42* (2013.01); *F25J 2245/02* (2013.01); *F25J 2270/02* (2013.01); *F25J 2270/80* (2013.01); *Y02C 10/12* (2013.01)

(56) References Cited

OTHER PUBLICATIONS

FR 1153245, French Search Report and Written Opinion, Feb. 9, 2012.

Aspelund et al., "Gas Conditioning—The Interface Between CO2 Capture and Transport", vol. 1, No. 3, Jun. 16, 2007, pp. 343-354.

* cited by examiner

METHOD AND APPARATUS FOR LIQUEFYING A GAS OR COOLING A FEED GAS AT SUPERCRITICAL PRESSURE

CROSS REFERENCE TO RELATED APPLICATIONS

This application is a 371 of International PCT Application PCT/FR2012/050797, filed Apr. 12, 2012, which claims priority to French Application 1153245, filed Apr. 14, 2011, the entire contents of which are incorporated herein by reference.

BACKGROUND

The invention relates to a method and an apparatus for liquefying a feed gas or cooling a feed gas at supercritical pressure, for example a gas rich in carbon dioxide, comprising for example at least 60 mol % carbon dioxide, or even at least 80 mol % carbon dioxide.

SUMMARY

According to this method the gas is condensed or the gas is cooled at supercritical pressure, for example $CO_2$, against an available cold source. Said source can be a flow of air or water at a pressure of between 70 and 100 bar. It is then necessary to subcool the gas which has been condensed or cooled in an exchanger before dividing it to form several liquid flows which are then vaporised at different pressure levels. These different pressure levels are reached by expanding at least one of the liquid flows. The liquids are vaporised in the exchanger to provide cold whilst the remaining liquid product is sent to storage facilities.

The disadvantage of this basic model is having to subcool the liquid or gas to −50° C. in one stage, which means imposing over the whole exchange line the high starting pressure which can be greater than 80 bar. This high pressure places constraints on the exchanger in that the passage section has to be reduced as well as the number of headers enabling the input or output of fluid.

The invention aims to subcool the liquid or cooled gas in a simple exchanger with two fluids and with dimensions for maximum pressure. The subcooled liquid is then expanded but at a sufficiently high pressure so as not to vaporise. The following exchanger, generally more complex, can thus be dimensioned with a much smaller pressure restraint.

It is necessary to make sure that the subcooled liquid or cooled gas is not expanded too much between the two exchangers to avoid a gas phase which would go round in a circle and which would make it necessary to use a gas/liquid separation tank.

Preferably, the expanded liquid or the expanded gas is separated downstream of the first exchanger into two flows. One of them is subcooled solely so as be able to expand at a pressure of about 18 to 26 bar (which corresponds to the aspiration pressure of the third compression wheel when there are four of them up to condensation pressure) without the production of gas (which avoids investing in a separator tank). These two flows actually feed the two vaporisations at higher pressure ("HP" and "HHP"). This makes it unnecessary to subcool these liquids to about −50° C., which would lead to significant power losses because of thermal differences. In such cases it would not be possible to remove the fluid at an intermediate level as that would increase the number of headers on the exchanger.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
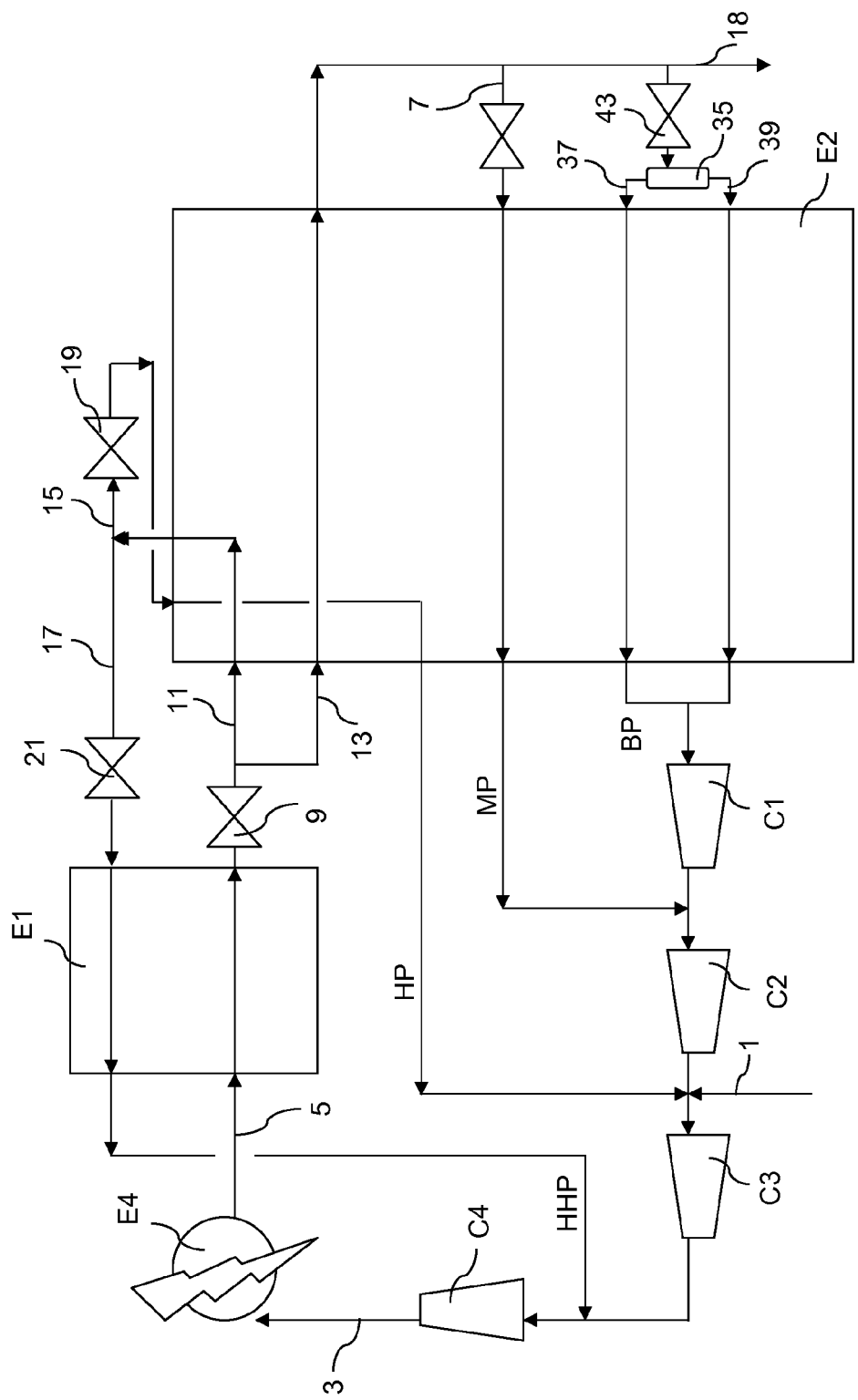
FIG. 1 illustrates one embodiment of the present invention.

The present invention aims to reduce the cost and the complexity of the exchange line of a liquefier.

According to one object of the invention a method is provided for liquefying a feed gas or cooling a feed gas at supercritical pressure, for example a gas rich in carbon dioxide, wherein the feed gas mixed with a cycle gas is condensed to form a liquid at the first pressure or the feed gas mixed with a cycle gas is cooled to form a gas cooled at the first pressure if the latter is supercritical, the liquid or cooled gas is cooled at the first pressure in a first heat exchanger, the cooled liquid or cooled gas is removed from the first exchanger and is expanded to a second pressure lower than the first pressure to form an expanded flow, at least a portion of the expanded flow is cooled in a second heat exchanger, the expanded flow is removed from the second heat exchanger, it is divided into at least two portions, including a first portion and a second portion, the first portion of the expanded flow forms the liquefied product, the second and preferably a third portion vaporises in the second heat exchanger and the at least one cycle gas thus formed is therefore mixed with the feed gas and compressed in a compressor after or before being mixed with the feed gas.

According to other optional features:
  a portion of the expanded flow is cooled in the second heat exchanger to an intermediate temperature thereof and at least a fraction of this portion is expanded, heats in the second heat exchanger and is sent to the compressor or one of the compressors, possibly after having been compressed;
  a portion of the expanded flow is expanded again, heats in the first heat exchanger and is sent to the compressor;
  a portion of the expanded flow is cooled in the second heat exchanger to an intermediate temperature thereof before being expanded again;
  only the liquid at the first pressure and another fluid exchange heat in the first exchanger;
  no flow sent to the second exchanger has a pressure that is greater than 60 bar;
  the flows sent to the first exchanger have a pressure that is greater than 40 bar;
  the liquid or cooled gas is cooled at the first pressure in a first heat exchanger only by exchanging heat with a single other fluid;
  at least a portion of the expanded flow is cooled in a second heat exchanger by exchanging heat with a plurality of other fluids.

According to another object of the invention an apparatus is provided for liquefying a feed gas or cooling a feed gas comprising a compressor, a first heat exchanger, a second heat exchanger different from the first heat exchanger, condensation or cooling means connected to the compressor, a pipe for bringing the feed gas mixed with a cycle gas to condensation or cooling means, a pipe for bringing at least a portion of the condensed liquid or gas cooled by condensation or cooling means to the first exchanger to form a cooled liquid or a cooled gas at the first pressure, a valve, a pipe for sending the cooled liquid or cooled gas to the valve to expand it to a second pressure lower than the first pressure to form an expanded flow, a pipe for sending at least a portion of the expanded flow to the second heat exchanger, a pipe for removing the expanded flow from the second heat exchanger, a pipe for transporting a first portion of the expanded flow forming the liquefied product, pipes for bringing a second and preferably a third portion of the expanded flow to vaporise in the second heat exchanger to form a cycle gas, at least one pipe for bringing the cycle gas to the compressor, means for mixing the cycle gas and the feed gas upstream or downstream of the compressor and possibly at least one compression means upstream of the compressor for compressing the cycle gas.

The apparatus can comprise:

a pipe for sending a portion of the expanded flow to an expansion means and a pipe for sending the portion from the expansion means to the first exchanger and possibly a pipe for sending the portion of expanded flow to cool in the second heat exchanger upstream of the expansion means;

a pipe for sending a portion of the cooled expanded flow into the second heat exchanger up to an intermediate temperature thereof to an expansion means and a pipe for sending the portion from the expansion means to the second exchanger.

The first exchanger can comprise only means for enabling the exchange of heat between only two fluids, for example only two series of exchange passages.

The second exchanger can comprise means for enabling the exchange of heat between at least three fluids, preferably at least six fluids.

The second exchanger can be connected to pipes for bringing a second and third portion of the expanded flow to vaporise there.

The first exchanger can be a brazed aluminium plate and fin exchanger.

The first exchanger can be a tube and shell exchanger. In this case the phase separator upstream of the first exchanger can be removed, the shell performing this role.

All of the percentages relating to purities are molar percentages.

The invention will be described in more detail with reference to the figures which illustrate the methods according to the invention.

In FIG. 1 a feed gas 1 can be a gas rich in carbon dioxide containing 98% carbon dioxide and 2% nitrogen. The gas 1 is compressed in a compressor C3 to a pressure of 43 bar. Then it is compressed to 80 bar in a compressor C4. The gas at 80 bar is cooled in a cooler E4 to produce a supercritical gas 5. The gas 5 is cooled in a first exchanger E1 and then expanded in a valve 9 to a pressure of 55 bar without producing gas but producing liquids 11, 13.

Alternatively, if the gas compressed in the compressor C4 is at subcritical pressure it will be condensed in the cooler E4 and the liquid formed will be cooled in the first exchanger E1 and then expanded in a valve 9 to a pressure of 55 bars without producing gas.

The first exchanger E1 is a plate and fin exchanger made of brazed aluminium or a tube and shell exchanger for example. The expanded liquid is divided into two flows 11, 13. The liquid 13 is cooled in a second exchanger E2 to the cold end of the latter. The liquid 13 is divided into three. One portion 18 forms the liquid production of the method and is sent to storage at 7 bar. On portion 7 is expanded at 12 bars without producing gas, heated in the second exchanger E2 and sent upstream of a compressor C2. The remaining portion is expanded in a valve 43 and sent to a phase separator 35.

The gaseous fraction 37 formed in the phase separator and the liquid fraction 39 are heated separately in the second exchanger E2, which is a plate exchanger made of brazed aluminium. The liquid fraction vaporises and is mixed with the gaseous fraction, the mixture being sent to the compressor C1. The flow compressed in the compressor C1 is mixed with the flow 7 and compressed in the compressor C2 prior to being mixed with the feed gas 1 and the flow 15.

The other portion of liquid 11 coming from the valve 9 is cooled to an intermediate temperature of the exchanger E2. Then the portion is divided into two flows. The flow 17 is expanded to 43 bar in a valve 21 without the production of gas and heated in the first exchanger E2 before being recycled upstream of the compressor C4 to 43 bar. The gas formed in the separator tank short circuits the exchanger E2 and mixes with the liquid vaporised upstream of the compressor C4. The other flow 15 is expanded in a valve 19 from 55 bar to between 18 and 26 bar, without producing gas, for example to 24 bar. Then the flow 15 is sent to the second exchanger E2 at an intermediate temperature, heated and recycled downstream of compressor C2 and upstream of compressor C3.

Figure 2:
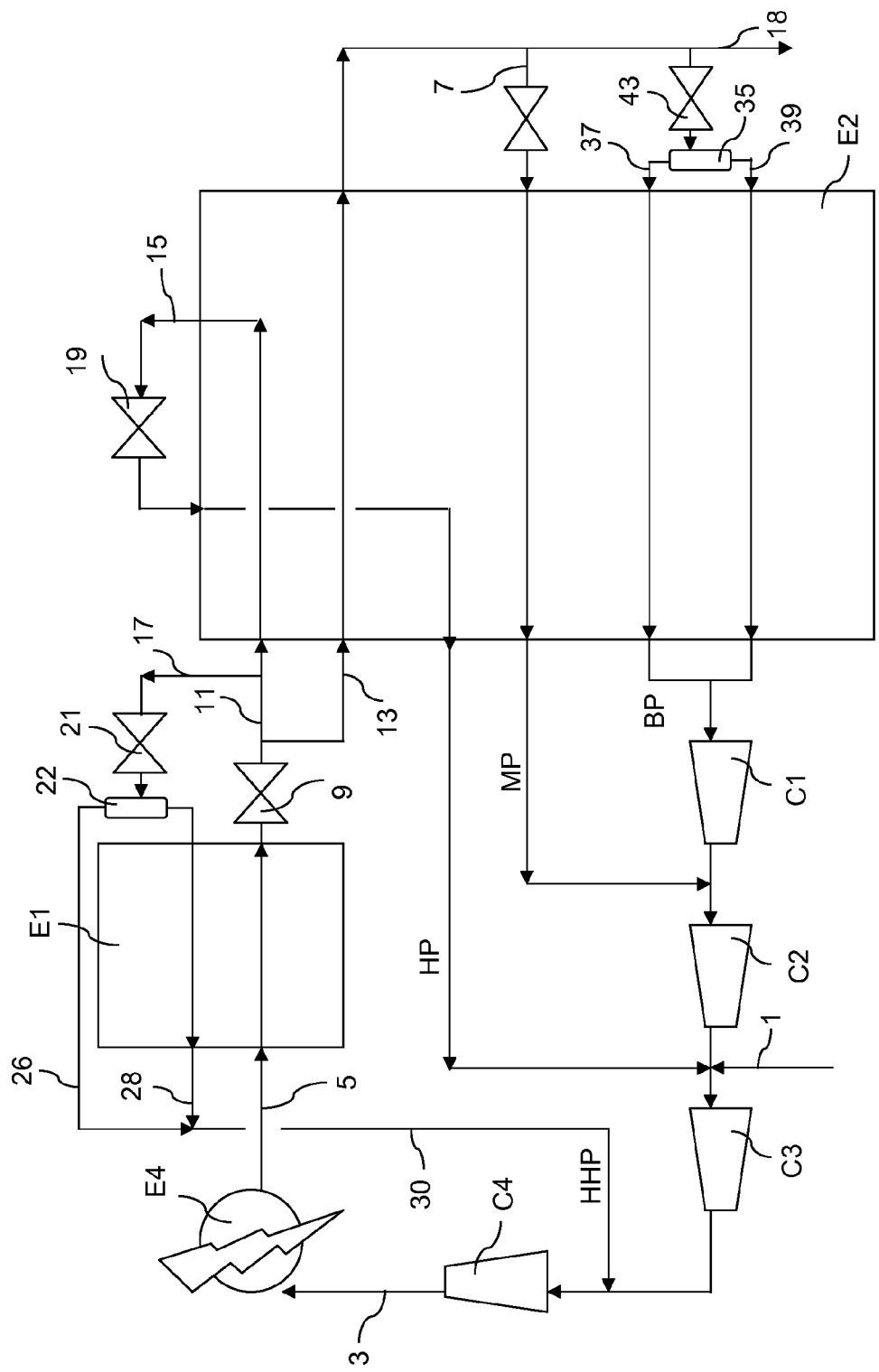
FIG. 2 illustrates another embodiment of the present invention.

In FIG. 2, unlike FIG. 1, the flow 17, is not cooled in the second exchanger E2 but is expanded, without having been cooled beyond the coldest temperature of the exchanger E2, to 43 bar in a valve 21 and sent to a separator tank 22. The liquid formed 28 heats and vaporises in the first exchanger E2 prior to being recycled upstream of compressor C4 to 43 bar. The gas 26 formed in the separator tank short circuits the exchanger E2 and mixes with the vaporised liquid 28 upstream of the compressor C4.

Figure 3:
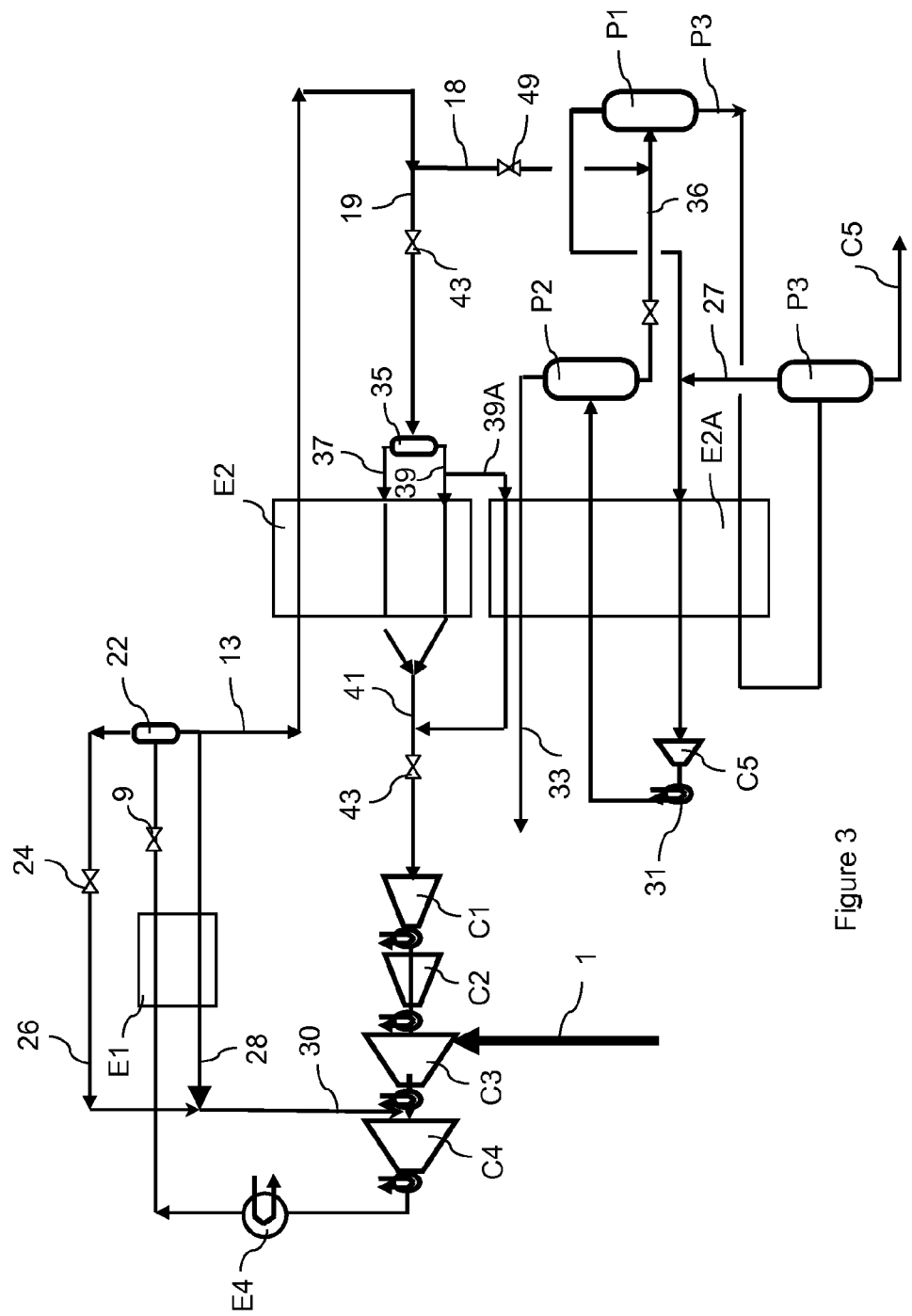
FIG. 3 illustrates another embodiment of the present invention.

In FIG. 3 the liquid formed in the phase separator 22 is divided into two. One portion 13 cools completely in the second exchanger E2 and the other flow 28 vaporises in the first exchanger E1 before being mixed with the first flow.

To reduce the cost of the exchanger E2, the latter is divided into two exchangers E2, E2A. The liquid flow from the phase separator 35 is divided into two portions. One portion 39 heats in the exchanger E2A and the other portion heats in parallel in the exchanger E2A.

Here we see that the flow 18 can be processed subsequently by separation in phase separators P1, P2, P3 at subambient temperature. The flow 18 expanded in a valve 49 is sent to the phase separator P1. The liquid 23 of the phase separator is vaporised in the exchanger E2A then sent to the phase separator P3 to produce a flow of liquid $CO_2$ 25. The overhead gas 27 of separator P3 and the overhead gas of separator P1 are mixed, heated in the exchanger E2A, possibly compressed by a compressor C5, cooled in an exchanger 31 then cooled in the exchanger E2A before being sent to a phase separator P2. The overhead gas 33 of the separator P2 heats in the exchanger E2A and the liquid from the tank 36 is sent to the separator P1.

Here it can be seen that the number of fluids in the exchanger E2 is reduced to a minimum as only the low pressure flow 19 vaporises there.

Figure 4:
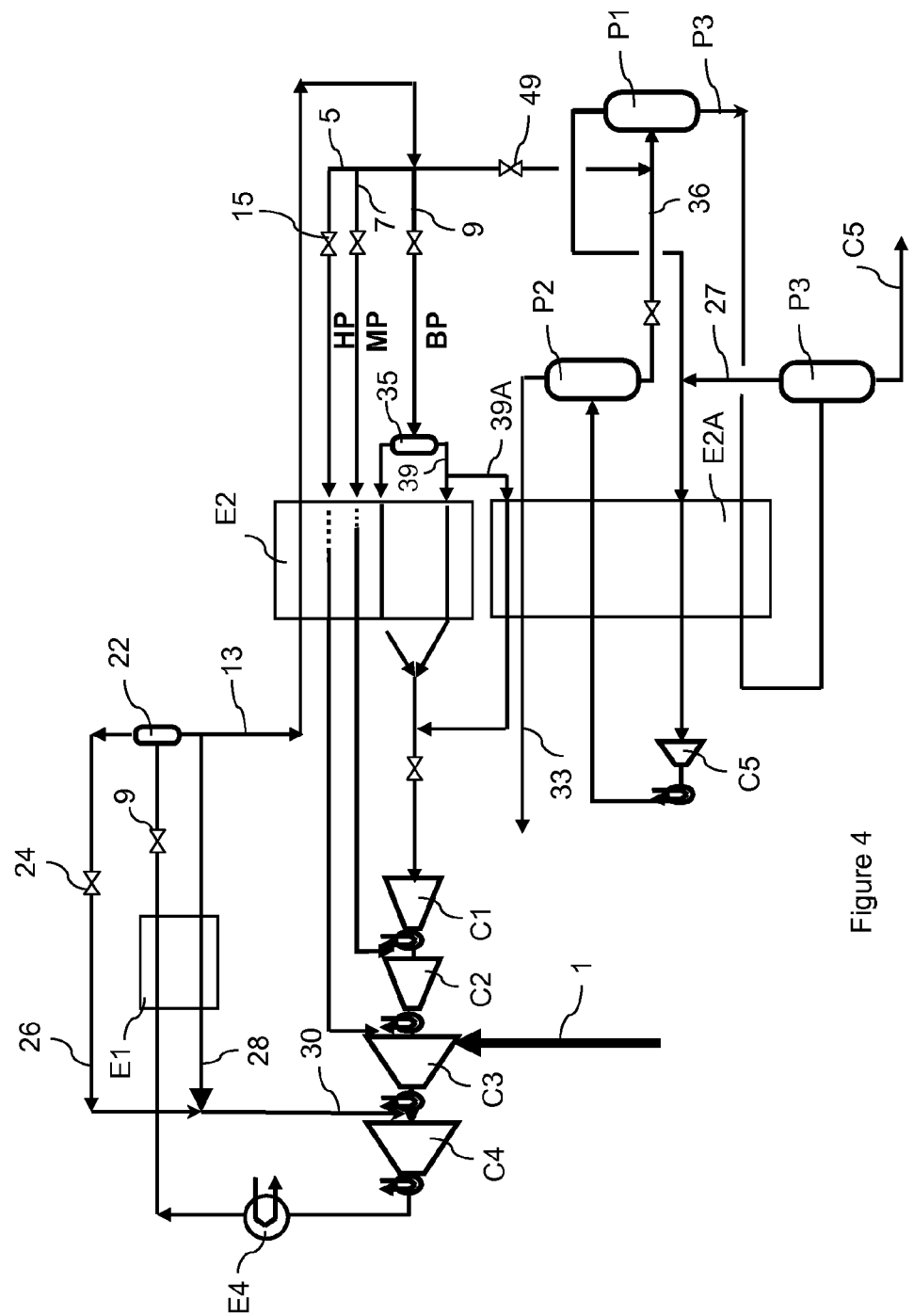
FIG. 4 illustrates another embodiment of the present invention.

FIG. 4 shows a more complex version of FIG. 3 wherein three flows 5, 7, 9 at three different pressures vaporise in the second exchanger E2.

Thus in all of the figures, the first exchanger E1 only contains two series of passages and therefore allows the exchange of heat between two single fluids. In this method only the second exchanger E2 has a gas input box.

The coolers between the compressors C1, C2, C3 and C4 of FIGS. 1 and 2 have not been illustrated for reasons of simplification.

No flow sent to the second exchanger E2 is at a pressure that is greater than 60 bar.

The two flows 5, 17 sent to the first exchanger E2 are at a pressure that is greater than 40 bar.

In the figures HHP denotes "very high pressure", HP denotes "high pressure", MP denotes "medium pressure" and BP denotes "low pressure", the references being cited in order of pressure from highest to lowest.

The compressors C1, C2, C3, C4 can form the stages of one or two compressors.

In the figures the vaporisation of the flow 7 in the second exchanger E2 is not absolutely essential but makes it possible improve the effectiveness of the exchange.

FIGS. 1 to 4 show the separation of a flow 1 which is introduced at the input pressure of compressor C3. It is clear that the flow can be introduced at the input of another compressor C1, C2, C4, or even at the output of the compressor C4 if it is at very high pressure.

Preferably, the vaporisation of the cycle liquid is performed at the same pressure as in the stages of compression C1, C2, C3, C4 of compression, four being the optimum number.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A method for liquefying a feed gas or cooling a feed gas at supercritical pressure, the method comprising the steps of:
    cooling the feed gas mixed with a cycle gas in a first heat exchanger to form a cooled fluid at a first pressure, wherein the cooled fluid is condensed within the first heat exchanger if the first pressure is below the critical pressure of the feed gas mixed with the cycle gas, wherein the cooled fluid is a supercritical fluid if the first pressure is above the critical pressure of the feed gas mixed with the cycle gas, wherein the feed gas mixed with the cycle gas is cooled against a single vaporizing fluid within the first heat exchanger;
    removing the cooled fluid from the first exchanger and expanding the cooled fluid to a second pressure lower than the first pressure to form an expanded flow;
    cooling a first portion of the expanded flow in a second heat exchanger to form a cooled first portion of the expanded flow;
    removing the cooled first portion of the expanded flow from the second heat exchanger;
    dividing the cooled first portion of the expanded flow into at least a first fraction and a second fraction, wherein the first fraction forms a liquefied product; and
    expanding the second fraction and vaporizing the expanded second fraction in the second heat exchanger to form at least a portion of the cycle gas that is then mixed with the feed gas and compressed in a compressor after or before being mixed with the feed gas;
    wherein a second portion of the expanded flow cools in the second heat exchanger to a temperature between the temperature of a cold end and a warm end of the second heat exchanger prior to being expanded again to form an expanded second portion; wherein a third portion of the expanded flow is expanded again, heated in the first heat exchanger and then sent to the compressor.

2. The method of claim 1, wherein the expanded second portion is heated in the second heat exchanger and is sent to the compressor.

3. The method of claim 1, wherein only the feed gas mixed with the cycle gas and another fluid exchange heat in the first exchanger.

4. The method of claim 1, wherein no flow sent to the second exchanger has a pressure that is greater than 60 bar.

5. The method of claim 1, wherein flows sent to the first exchanger have a pressure that is greater than 40 bar.

6. The method of claim 1, wherein the cooled fluid is formed in the first heat exchanger only by the exchange of heat with a single other fluid.

7. The method of claim 1, wherein at least a portion of the expanded flow is cooled in the second heat exchanger by exchanging heat with several other fluids.

8. The method of claim 1, wherein the expanded flow is at a sufficiently high pressure so as not to vaporize during expansion.

* * * * *